United States Patent [19]

Goldner

[11] 3,787,755

[45] Jan. 22, 1974

[54] RECTIFIER

[75] Inventor: Heinz-Dieter Goldner, Schwalbach, Germany

[73] Assignee: Hartmann & Braun Aktiengesellschaft, Frankfurt/Main, Germany

[22] Filed: Feb. 14, 1973

[21] Appl. No.: 332,439

[30] Foreign Application Priority Data

Feb. 21, 1972 Germany ........................2207990

[52] U.S. Cl. .................... 321/8 R, 321/47, 307/253, 324/119

[51] Int. Cl. ............................................ H02m 7/00

[58] Field of Search..... 321/8, 47; 307/253; 330/97, 330/104; 324/119

[56] References Cited

UNITED STATES PATENTS

| | | | |
|---|---|---|---|
| 3,310,726 | 3/1967 | James | 321/8 R |
| 3,411,066 | 11/1968 | Bravenec | 324/119 X |
| 3,564,387 | 2/1971 | Gadberry | 321/8 R |
| 3,491,252 | 1/1970 | Petromilos | 321/8 R X |
| 3,509,372 | 4/1970 | Bicking | 321/47 |
| 3,588,671 | 6/1971 | Deboo | 321/47 |
| 3,631,342 | 12/1971 | McDonald | 324/119 X |
| 3,721,891 | 3/1973 | Moses | 321/47 |

*Primary Examiner*—William M. Shoop, Jr.
*Attorney, Agent, or Firm*—Smyth, Roston & Pavitt

[57] ABSTRACT

Disclosed is an electronic circuit for converting an a-c voltage into a d-c voltage. The a-c voltage is applied to a feedback amplifier incorporating a negative feedback loop having a plurality of diodes and resistances. The voltage across the diodes is used to derive a square wave signal from the amplifier, which renders a transistor switch conductive or non-conductive, depending on the polarity of the amplified signal. The amplifier output is also coupled to an RC circuit, whose capacitance is charged by alternating half-waves while the transistor switch suppresses the respective other half-waves.

3 Claims, 1 Drawing Figure

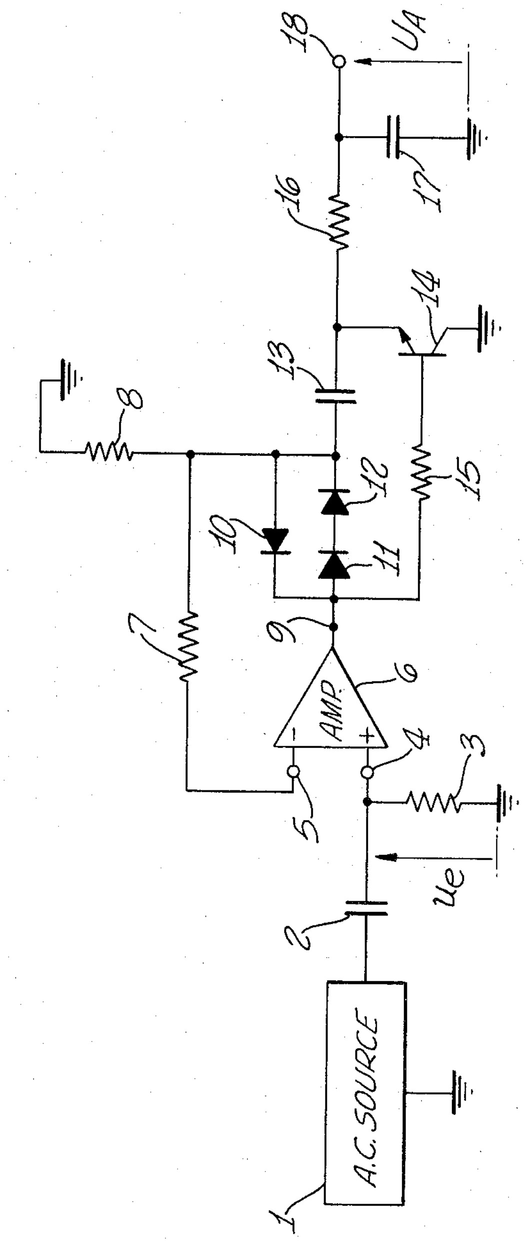
A.C. SOURCE
AMP.
UA
ue
1
2
3
4
5
6
7
8
9
10
11
12
13
14
15
16
17
18

RECTIFIER

BACKGROUND OF THE INVENTION

The invention relates to a circuit for converting an a-c voltage into a d-c voltage, particularly in measuring instruments.

Rectifiers are already known in the art which incorporate a feedback amplifier having a negative feedback loop which includes a diode network. Such a device is, for example, described in German printed patent application No. 1,437,943. The diodes are arranged in such devices for one-way rectification of an a-c voltage potential to be measured. Upon placing the diodes into the network of the negative feedback loop of the amplifier, the rectified signals become essentially independent from the conduction resistance of the diodes; this is primarily the result of the stabilizing feedback effect on the amplifier. However, these conventional inverter devices have the disadvantage that the drift of the d-c potential of the amplifier is immediately superimposed upon the rectified (true) output-signal. As a consequence, the circuit is unsuitable for measuring minute alternating potential signals.

SUMMARY OF THE INVENTION

It is an object of the invention to provide a circuit arrangement, incorporating the advantages of the known inverters, but enabling also rectification of rather minute alternating voltage signals by means of a low-drift circuit, so as to obtain a proportional d-c voltage.

According to the preferred embodiment of the invention, it is suggested to couple the output of a high gain amplifier to an electric storage capacitor via a series-connection of a diode network and a blocking capacitor. A controllable switch is connected in parallel to the charging circuit of the storage capacitor, and the switch is controlled by the output of the amplifier as modified by the diodes. The diodes constitute a part of the feedback loop for the amplifier and produce a square wave signal that is effective on the switch for operating the switch in substantially driftless synchronism with the zero crossings of the a-c voltage.

In a preferred embodiment of the invention, the controllable switch is a transistor, the collector-emitter path of which extends parallel to the charging circuit of the storage capacitor, and the base of the transistor is connected to the amplifier output. The diodes are effective across the base-emitter path of the transistor, so that the diode threshold voltage is available for switching already at low inputs, near the zero crossings of the a-c waves.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates a block diagram of the circuit according to the preferred embodiment of the invention.

DESCRIPTION OF THE PREFERRED EMBODIMENT

Proceeding now to the detailed description of the drawing, a source 1 furnishes an a-c voltage which is to be measured. Source 1 is connected to the non-inverting input 4 of a high-gain amplifier 6 via a capacitor 2, and produces across a grounded resistor 3 an input signal $U_e$. A feedback network connects the output 9 of amplifier 6 with the inverting input 5 of the amplifier. The feedback network comprises a diode 10 and a pair of diodes 11 and 12 connected in parallel to the diode 10, but for opposite direction of conduction. The feed-back circuit includes additionally resistances 7 and 8, the latter being grounded. The source 1 could be coupled to the amplifier input 5 via a resistance instead.

A blocking capacitor 13 is connected in series with the diode arrangement 10, 11 and 12. Capacitor 13 decouples a storage or sampling capacitor 17 and a charging resistance 16 from the amplifier output 9 as far as galvanic, ohmic connection is concerned, but the capacitor 13 passes faithfully the a-c. The collector-emitter path of a transistor 14 is connected in parallel to the charging circuit of storage capacitor 17. Transistor 14 is used as a switching element in the capacitor circuit. The collector of the transistor is directly connected to ground while the base electrode is coupled to the amplifier output 9 across a compensating resistance 15, by-passing the diode network. A smooth, i.e., relatively ripple free d-c output voltage $U_A$ is produced between the terminal 18 and ground; this output voltage is directly proportional to the a-c input voltage $U_e$, and may be fed to an indicating instrument, recording equipment or the like.

The operation of the circuit as described is as follows: The a-c input voltage $U_e$ is amplified in the amplifier 6, the internal gain of which is substantially higher than the external gain produced by the feedback network. The amplified a-c power signal is applied to the diode arrangement 10, 11 and 12 via resistance 7. The feedback network is tapped and the amplified voltage is applied to the emitter of transistor 14, via capacitor 13, for rectification by the transistor.

Unlike conventional rectifying systems, the present diode network 10, 11 and 12 does not serve to rectify the amplified alternating potential from the amplifier; instead, the network provides control for the transistor switch 14 and that control determines to what extent the a-c wave as applied to the charging circuit is to be effective. Particularly, a control current is fed to the base of the transistor, which is composed of the output signal from the amplifier and of a superimposed square wave signal as derived from the diode network and resulting from the diode threshold. This superimposed square wave enables the transistor to be positively controlled in its "on" or conducting state or to be blocked for non-conduction, depending on the polarity of the a-c voltage. The particular square wave is obtained in the following manner.

During a zero crossing toward a positive half cycle, $U_e$ is equal to zero and the amplifier, accordingly, does not (or is not supposed to) produce any output signals. Diodes 10, 11 and 12 are all non-conductive, i.e., they have extremely high ohmic resistance. The negative feedback network is practically ineffective while the amplifier operates at maximum internal gain. As soon as $U_e$ proceedes towards positive, though small voltage values, high-gain amplifier 7 produces a large positive output voltage so that the conduction threshold of diodes 11 and 12 is almost immediately traversed. The positive signal diode 10 remains blocked.

As soon as diodes 11 and 12 are conductive, the negative feedback network acts on the second inverting input of amplifier 7. Consequently, the voltage excursion on the amplifier output pursuant to the positive half cycle of the $U_e$ tends to be increased only by a value in accordance with the external gain factor as determined by the resistances 7 and 8. However, the voltage across the diodes will remain equal to the conduction threshold until $U_e$ has progressed sufficiently far into the positive phase so that the voltage amplified by operation of the external gain also exceeds this threshold.

It follows from the foregoing that the voltage across diodes 11 and 12 jumps to a level of twice the threshold potential upon which is superimposed the gradually increasing alternating potential. This voltage jump suffices to positively control the transistor to its "on" or conducting stage, even when the early phases of the a-c voltage as such (and as amplified in accordance with the external loop) would not suffice to ensure full conduction. Conduction of transistor 14 prevents the storage capacitor 17 from being charged by the positive half wave, though there may be some discharge, because the one end of resistor 16 connects to ground through the conductive transistor.

During the transition from positive to negative half cycle, the polarity of the amplified outputs is likewise reversed and diodes 11 and 12 become blocked. With a small negative input at amplifier 6 and due to its high gain, diode 10 is immediately conductive. As a result, a steep signal flank from the conduction levels of diodes 11 and 12 to the conduction level of diode 10 at negative polarity is effective at the base of transistor 14 for shifting the transistor rapidly into the nonconductive state. Subsequently, the storage capacitor 17 is charged to an extent equal to the amplitude of the negative half wave across the resistance 16. Charging continues until under negative to positive crossover the transistor 14 is rendered conductive again.

It can, thus, be seen that the amplifier circuit works basically as an operational amplifier, except that near the zero crossings, gain is not determined by the feedback resistors. As a consequence, near zero voltages are amplified in accordance with the high internal gain of the amplifier, so that the amplifier output rises, at first, (and drops at the end of the half wave) much faster than determined by the feedback if it were effective. Consequently, the diode thresholds are immediately overcome, and are available as switching voltages for the transistor in the early and in the late phases of any half wave, respectively pulling the transistor, e.g., into saturation conduction and out and of conduction without gradual transition.

The number of diodes used in the circuit depends on the threshold voltages thereof in relation to the switching characteristics of the transistor. It is important that the sum of the forward biased diodes in one half wave suffices to pull the transistor into full conduction, though over-saturation is not needed. Likewise, the forward biased diode or diodes for the reverse polarity should have threshold sufficient to pull the transistor out of conduction at the end of positive half waves. The diodes 10, 11, 12, together, make certain that a true rectangular signal is developed on the base of the transistor.

The value of charging resistance 16 is sufficiently high to prevent an undesired excessive discharge of the capacitance 17 during each positive half wave, while the charge is or may be augmented on negative cycles. Soon quasi-stationary conditions will prevail on the capacitor. Each zero crossing produces a steep signal flank in the manner hereinbefore described. Depending upon the direction of that flank or edge, transistor switch 14 is either rapidly closed or opened. The storage capacitor is charged or discharged in-between these flanks, depending on the polarity and amplitude of the respective a-c half wave, whereby particularly the charging process is accurately defined by the contour of a negative half wave, from beginning to end with no belated onset or premature cut-off. The charge process of capacitor 17 itself depends on whether the momentary (negative) amplitude of $U_e$ is larger or smaller than the preceding one.

The d-c output voltage $U_A$ between the terminal 18 and ground, is directly proportional to the d-c input $U_e$, both voltages having the same reference potential and ground potential. The direct current output voltage is available directly for indication, control or any other purpose.

In order to avoid changes in the rectified voltage due to temperature dependent parasitic voltages and currents of the transistor, the latter is operated as an inverting switch. Contrary to conventional diode rectifying devices, the transistor arrangement as described, operates practically as an ideal switching element which positively rectifies the applied a-c input voltage and whose "on" and "off" switching stages are both controlled by the same input voltage.

The invention is not limited to the embodiments described above but all changes and modifications thereof not constituting departures from the spirit and scope of the invention are intended to be included.

I claim:

1. A rectifying circuit for converting an a-c voltage into a d-c voltage, comprising:

a high gain amplifier with negative feedback circuit and signal input connected to receive the a-c voltage;

the feedback circuit including first and second diode means connected in parallel to each other but for opposite conduction and including resistance means serially connected therewith;

an electronic switch connected to said network, so that the amplifier output as well as the voltage drop across the diode means is effective on the switch; and an electric storage capacitor having a charging circuit parallel to said switch, said storage capacitor being adapted to be charged when said switch is off during half waves of one polarity.

2. A circuit as in claim 1, including a blocking capacitor intermediate said storage capacitor and said diode means.

3. A circuit as in claim 1, the electronic switch being a transistor having main electrodes and control electrodes, the main electrodes being connected across the storage capacitor, the control electrode being connected to the amplifier output so that the voltage across the diode means is effective between the control electrode and one of the main electrodes.

* * * * *